Patented Aug. 8, 1939

2,168,325

UNITED STATES PATENT OFFICE

2,168,325

FLUID COMPOSITION

Ivor M. Colbeth, East Orange, N. J., assignor to The Baker Castor Oil Company, Bayonne, N. J., a corporation of New Jersey No Drawing. Original application July 13, 1935, Serial No. 31,210. Divided and this application July 21, 1938, Serial No. 220,455

6 Claims. (Cl. 252—5)

This invention relates to liquid compositions for use in connection with fluid pressure operated devices, such as hydraulic brake systems for automobiles, etc., for transmitting the pressure. This is a division of my application Serial No. 31,210, filed July 13, 1935.

A liquid composition for such purposes can be prepared in accordance with the present invention which possesses the desirable properties to a remarkable extent and does not require extraordinarily expensive materials or very complicated chemical processes. The type of chemical reactions used for preparing the ingredients are well known and the materials used are readily procurable.

Fluid compositions for use in fluid pressure operated devices should possess the desirable properties of not freezing or becoming too viscous at low temperatures or having portions settle out, should be free from decomposition at high temperatures, should not have any acids or other ingredients therein that would attack metals, should be capable of being diluted with diluents in which the fluid should be soluble, which diluents themselves do not possess properties that would be objectionable in such hydraulic pressure fluids, should have a high boiling point and low vapor pressure, should have a reasonably uniform viscosity at different temperatures, low cost and ease of manufacture, and should not swell or otherwise injuriously affect rubber.

In carrying out this invention an ester is used which is an ester of an acid of the chain series and a mono-, di- or tri- hydroxy alcohol. The acid may be acetylated before the ester is formed with the alcohol, or the ester itself may be acetylated after it has been formed, by methods already known. The acetylation should be caused to take place at some portion of the chain of the acid or acid radical other than at the carboxyl group or end of the chain. A mixture of such acetylated esters may be used, and the acid radicals should replace all of the H atoms of the alcohol hydroxyls in forming the esters.

The underlying principle of this invention is that the esters that are present in the composition are esters that have acetyl groups, $CH_3CO$, substituted for H atoms of hydroxyl groups that are attached to carbon atoms of the chain of the acid radicals, which carbon atoms in turn do not have oxygen atoms attached thereto by double bond, and the acetylated acid radicals are substituted for the H atoms of the hydroxyls of the alcohols.

Among a very large number of acids that are suitable may be mentioned ricinoleic, hydroxystearic, dihydroxy stearic and ricinic acid, which are especially suitable, and among the large number of alcohols that are suitable may be mentioned methyl, ethyl, butyl, isopropyl, diethylene and triethylene glycols, glycerol, and other mono-, di-, and tri- alcohols of the fatty acid series which are especially suitable for this invention.

The esters are mixed with a diluent to form the composition that is to be used. The diluent should have a low viscosity and a low freezing point. It has been found that such diluents as diacetone alcohol and diethylene glycol ether, for example, are quite satisfactory for this purpose, although many other aliphatic alcohols, such as methyl, ethyl, butyl, isopropyl, etc., which have low viscosity and low freezing points, are suitable.

The following are given as specific examples of carrying out the invention, but it is to be understood that they are given for illustrative purposes and that the invention is not limited to the particular materials, time, temperature, etc., given in the examples.

*Example 1.*—Castor oil is treated with acetic anhydride by refluxing at the boiling point of acetic anhydride until all acetic acid that can be combined with the castor oil is combined. Castor oil consists of about 85% of the ester of ricinoleic acid and glycerol and about 15% of the glycerol esters of oleic and linoleic acids with small amounts of hydroxy stearic and stearic acid.

About 400 parts by weight of castor oil is treated with 400 parts by weight of acetic anhydride of at least 92% strength at a temperature of about 118° C. for approximately two hours while the acetic anhydride that condenses in the reflux condenser is returned to the mixer. The mixture is then freed from excess acetic anhydride and acetic acid that is formed during the reaction, by distilling under vacuum, or is removed in any other convenient way. The last traces of acetic acid can be removed by passing a current of superheated steam through the mixture until the condensed steam is free from acidity. The oil thus treated is commercially known as acetylated castor oil. This acetylated oil can be heated for several hours to a temperature of 250° C. without any appreciable decomposition.

The acetylated castor oil is then dissolved in about 50% by volume of diethylene glycol ether. The composition so prepared can be kept at a temperature below —35° C. indefinitely without freezing or becoming too viscous to be used in hydraulic pressure systems, and also without crystallizing.

*Example 2.*—Approximately equal parts by weight of acetylated butyl ricinoleate or acetylated ethyl ricinoleate, or acetylated diethylene glycol ricinoleate, or a mixture of two or more of them, may be used instead of castor oil, the acetylated ricinoleates being obtained on the market or prepared by esterifying acetylated ricinoleic acid in the usual way with butyl alcohol or ethyl alcohol or diethylene glycol. Or, ricinoleic acid may be esterified by treating it with ethyl alcohol, butyl alcohol or diethylene glycol and the ester then acetylated in the usual way. The acetylated product is mixed with a diluent, as described in Example 1. However, the most convenient source now known of the glyceride of ricinoleic acid is castor oil.

What is claimed is:

1. A liquid composition for fluid pressure systems comprising acetylated glyceryl tri-ricinoleate, together with diethylene glycol ether, the acetylation being at a hydroxyl group of the acid radical not in the carboxyl group.

2. A liquid composition for fluid pressure systems comprising acetylated castor oil, together with diethylene glycol ether, the acetylation being at a hydroxyl group of the acid radical not in the carboxyl group.

3. A liquid composition for fluid pressure systems, comprising a substantially completely esterified ester of a substantially completely acetylated hydroxy fatty acid, said acid containing about 18 carbon atoms, together with diethylene glycol ether, the acetylation being at a hydroxyl group of the acid radical not in the carboxyl group.

4. A liquid composition for fluid pressure systems, comprising a substantially completely esterified glycerol ester of a substantially completely acetylated hydroxy fatty acid, said acid containing about 18 carbon atoms, together with diethylene glycol ether, the acetylation being at a hydroxyl group of the acid radical not in the carboxyl group.

5. A liquid composition for fluid pressure systems, comprising a substantially completely esterified glycol ester of a substantially completely acetylated hydroxy fatty acid, said acid containing about 18 carbon atoms, together with diethylene glycol ether, the acetylation being at a hydroxyl group of the acid radical not in the carboxyl group.

6. A liquid composition for fluid pressure systems, comprising a substantially completely esterified butyl ester of a substantially completely acetylated hydroxy fatty acid, said acid containing about 18 carbon atoms, together with diethylene glycol ether, the acetylation being at a hydroxyl group of the acid radical not in the carboxyl group.

IVOR M. COLBETH.